May 22, 1923.
J. T. BARKELEW
TRACTOR CULTIVATOR
Filed Sept. 11, 1918
1,455,984
2 Sheets-Sheet 1
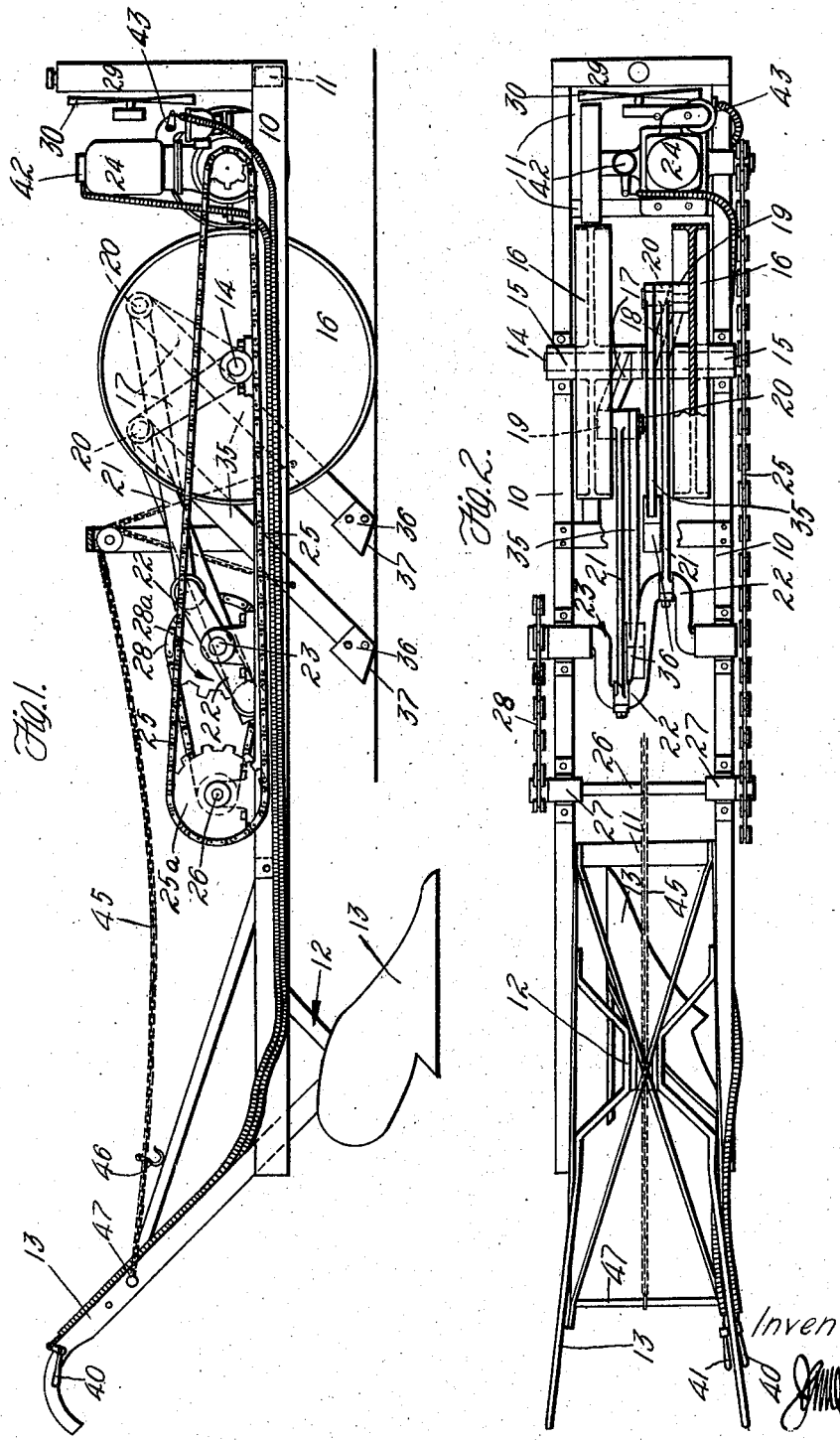

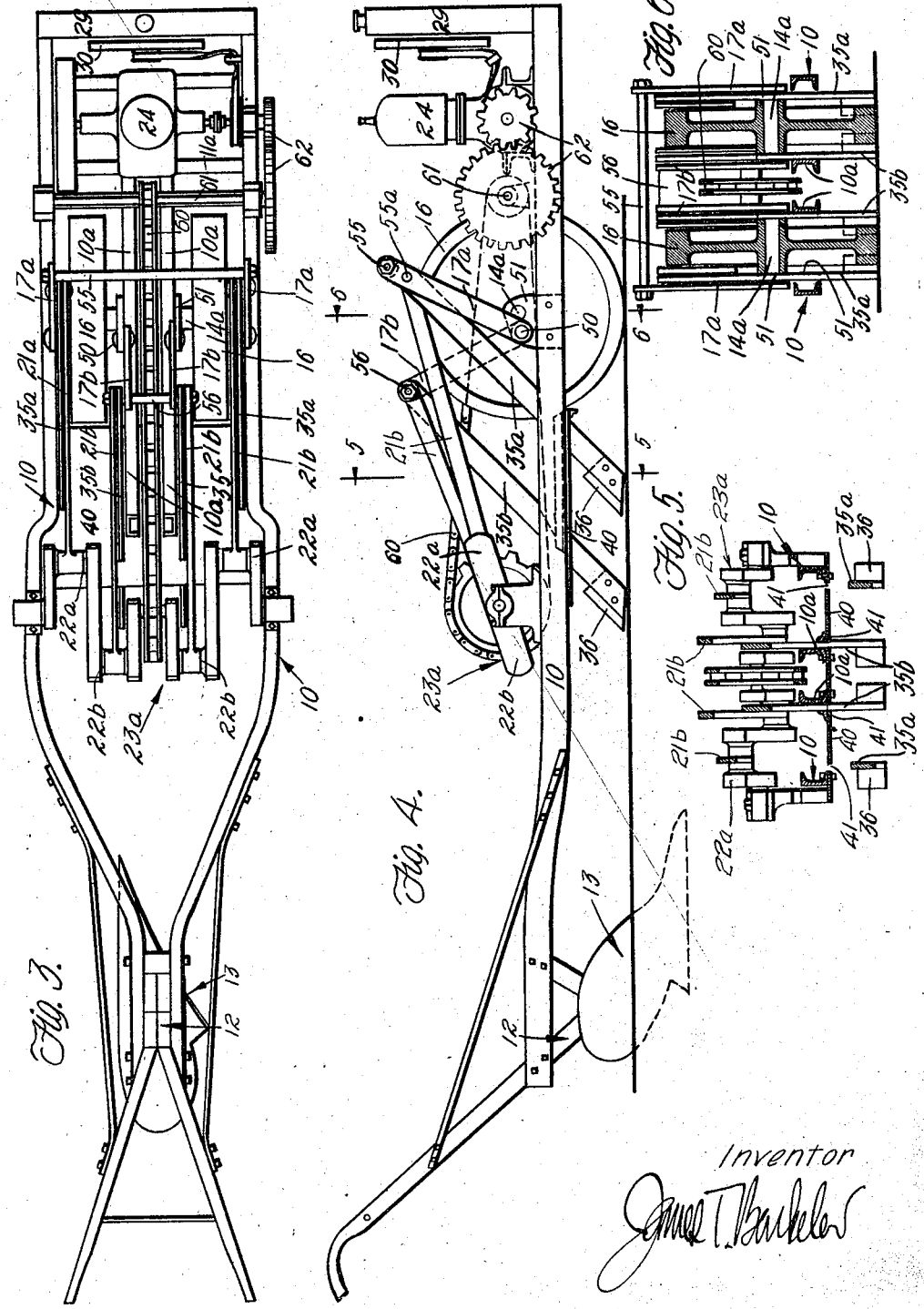
May 22, 1923.
J. T. BARKELEW
TRACTOR CULTIVATOR
Filed Sept. 11, 1918
1,455,984
2 Sheets-Sheet 2

Patented May 22, 1923.

1,455,984

UNITED STATES PATENT OFFICE.

JAMES T. BARKELEW, OF MONTEREY PARK, CALIFORNIA.

TRACTOR CULTIVATOR.

Application filed September 11, 1918. Serial No. 253,494.

*To all whom it may concern:*

Be it known that I, JAMES T. BARKELEW, a citizen of the United States, residing at Monterey Park, in the county of Los Angeles, State of California, have invented new and useful Improvements in Tractor Cultivators, of which the following is a specification.

This invention relates to tractors apparatus and particularly to such apparatus as applied to ground cultivation; although the tractor apparatus hereinafter described is not necessarily limited to that particular use. As applied to tractor mechanisms in general, and tractor cultivators in particular, it is an object of the invention to provide a machine of great simplicity, and one in which the tractive effort is approximately equal, or at least closely comparable, to the weight of the mechanism. And, furthermore, in tractor cultivator apparatus, it is an object to provide a small and easily handled mechanism capable of doing the lighter kinds of plowing and cultivation work, and capable of being handled by one man.

In a specific embodiment of the invention wherein the device is reduced to great simplicity, the apparatus is made to be handled by a man walking behind and controlling the device much as he would control an ordinary walking plow. However it will be readily understood from the following description that the tractor mechanism may be used for larger apparatus, and is not restricted to be handled and controlled in the simple manner described.

For the purpose of the following detailed description reference is had to the accompanying drawings in which—

Fig. 1 is a side elevation of a simple form of device; Fig. 2 is a plan thereof; Fig. 3 is a plan of a modified form; Fig. 4 is a side elevation thereof; and Figs. 5 and 6 are sections taken on lines 5—5 and 6—6, respectively, of Fig. 4.

In the simple form of device set forth in the drawings I provide a frame which may be constructed principally of longitudinal side frame members 10 and cross members 11. At the rear end of this frame I may provide a suitable mounting means as indicated at 12 upon which a soil cultivating implement 13 may be mounted. This implement may be a plow, harrow or any other soil cultivator; and the mounting means may be provided, in the well known manner, with arrangements for substituting different forms of cultivators. Handles 13 rise from the rear end of the frame; and it is by these handles that this form of my device is entirely guided and generally controlled.

Forward of the center of the frame I place a transverse axle 14 mounted in bearings 15 which may be secured directly to the upper sides of frame members 10. Axle 14 may or may not revolve; it may preferably be held stationary in the bearings 15; so that it forms a transverse member of the rigid frame. A pair of supporting wheels 16 is mounted on axle 14, one wheel just inside each frame member 10; and then between these wheels I mount radial arms 17. These arms 17 may have hubs 18 of some extent on the axle, so that a sufficient wearing surface is provided to give long life at the point where the arms 17 oscillate on the axle. Each oscillating arm 17 has a hub or boss 19 at its outer end and a knuckle pin 20 is mounted in this boss. A pair of connecting rods 21 connect to opposite throw cranks 22 on a crank shaft 23, and these connecting rods connect one to each one of the pins 20. Crank shaft 23 is driven by any suitable driving connection from motor 24. In order to attain the balance desired in a machine of this character I preferably mount motor 24 just forward of wheels 16 and preferably low down on the frame 10. Chain drive 25 extends from motor 24 to a transverse shaft 26 mounted in bearings 27 across the frame rearward of the crank shaft; and a chain drive 28 extends between shaft 26 and crank shaft 23. The direction of rotation is preferably that indicated in the drawings so that connecting rods 21 are most nearly horizontal during the back strokes of oscillating arms 17. Forward of the motor there may be a radiator 29 and cooling fan 30. Other details of construction in connection with the motor, etc., need not be herein shown or described, as they are commonly known.

In the simple form of device herein shown I provide two tractor legs and feet. One leg 35 is pivoted to each of the knuckle pins 20; and each leg carries on its lower end a foot 36 of sufficient lower end area to get proper area of contact with the ground. The lower ground engaging surface 37 may be at such an angle that the forward edge of the foot 36 more or less bites into the ground surface; but this angle, and the area of contact will depend very largely upon the character of soil and whether heavy or light work is being done. Legs 35 are of such a length that, for instance, they normally set at, say, an angle of 45°.

The general action of the device will be readily understood from the foregoing description. The engine operates the crank shaft and arms 17 are thereby oscillated between the two extreme positions shown in the drawings. The two arms move oppositely, one moving forwardly as the other moves rearwardly. Consequently, as one leg 35 is being pushed rearwardly (with relation to the frame of the machine) the other leg is being dragged forwardly with relation to the frame of the machine. When the relative positions of the two legs have been reversed, then the other leg pushes rearwardly and the other leg is then dragged forwardly. With the crank shaft and oscillating arms in the relative position illustrated and with rotation in the direction indicated, the forward leg movements will necessarily be faster than the rearward movements.

A feature of this device resides in its arrangement of weight with reference to the point of support. In handling the tractor by hand, it is desirable to have the weight as evenly balanced as possible; and accordingly the weight of the whole device is longitudinally balanced as closely as possible on the vertical center line C which passes through axle 14. The cultivator 13, etc. at the rear end of the frame may be included in the balance so that the whole device balances on center line C; or a certain amount of weight may be left unbalanced to normally hold the rear end down sufficiently to keep the cultivating tool in engagement with the soil. For instance, the weight of the whole machine except the cultivating tool may be balanced on center C. In any of these instances it will be seen that the operator can easily handle the whole mechanism because the weight is substantially balanced on the carrying wheels. This is an important feature as regards a small one-man device. But a more important feature regarding the balance of the machine is explained in the immediately following description; and this feature has to do with the efficiency of the traction apparatus regardless of its size and regardless of whether the device is designed to be handled by one man or is made in large size and intended always to be handled by power.

It will be readily understood that the tractive effort in this device is caused by rearward thrust lengthwise along the legs 35, the point of application of the thrust to the legs being at pins 20. Accordingly the point of application of the reactance on the machine is at pins 20. In other words, the machine pushes itself along and the point of application of the push to the machine is at one or the other of the pins 20. Now this push or propelling force applied at 20 to the machine is applied of course upwardly and forwardly at an angle depending upon the angle of the legs. If this angle is, say, 45°, and if sufficient power is applied to exert a push of say 1000 lbs. along a leg during its rearward motion, then an upward and forward diagonal push of 1000 lbs. would of course be exerted at one or the other of the pins 20. This diagonal push at 45° may be resolved into horizontal and vertical components of (in round figures) 700 lbs. each. In order to keep the 700 lbs. force from raising the machine, the machine, by its weight, must exert a downward force of 700 lbs. or more, on the pins 20. There will be a forward horizontal thrust on the machine of 700 lbs., which thrust will be unopposed except by the resistance of the cultivating tool. Thus it will be seen that in a mechanism of this character the forward thrust is approximately equal to the weight imposed upon the knuckle pins 20. Now it is a feature of this design that approximately, or as fully as possible, the whole weight of the machine is placed upon pins 20. Oscillating arms 17 are mounted on axle 15 and the center of weight is in the center line C through this axle. The position of each knuckle pin 20 oscillates above the axle and on each side of center line C. Consequently, in its average position, each knuckle pin 20 is in line with the longitudinal center of gravity of the machine; and therefore, in its average position, the whole weight of the machine is imposed on the knuckle pins—that is, imposed upon the knuckle pin which is at any time moving rearwardly. Thus in the case under supposition the apparatus will give the tractive effort of 700 lbs. before the machine will begin to rise off the ground. Of course in practice, with this simple form of machine, that point of tractive effort cannot be surpassed because if it were the machine would simply rise and the legs would work forward beneath it; but it is a feature of this machine to be particularly noticed that just in proportion as the machine is approaching its full tractive effort it is taking the weight off the wheels 16 and imposing that weight on the knuckle pins 20 and thus on the tractor legs and feet, making progress easier due to taking weight off the rolling support. When the action of the machine is looked at in this way, wheels 16 may be considered as being primarily merely a means of keeping the device from falling forward during the tractive action of the pusher legs.

In the simple form of machine herein illustrated the engine 24 may be controlled from hand levers 40 and 41 on one of the plow handles, which handles control timer 42 and throttle 43 of the motor. No transmission gearing is used; but when it is desired to stop the machine without stopping the motor the legs 35 may be lifted up by pulling upon a chain 45 attached to the legs, and hooking a hook 46 over cross bar 47. This method, or any other convenient method, may be used for lifting the feet off the ground. It may be an object in a device of this character to have the machine as light as convenient for purposes of light, fast cultivation; and this light weight of machine may not be heavy enough for the heavier, slower work. To increase the weight of the machine, weight may be added in any suitable manner; the wheels 16 may be constructed heavier so as to give sufficient weight to the machine. And then if a change of weight is desired heavy and light wheels may be substituted for each other. And to change the speed of the machine for light, fast work or heavy, slow work, one or more of the sprockets $25^a$, $28^a$, may be changed in size. The various heavy parts of the mechanism are kept as low as possible in order to keep the center of gravity low and keep the machine as stable as possible. In a machine of the character shown the center of gravity need not be any higher above the ground than the tread distance across wheel 16. Furthermore, the parts are so arranged that the transverse center of gravity is on the longitudinal center line of the mechanism.

In Figs. 2 to 6 I show a modified form of mechanism wherein there are two pairs of pusher legs $35^a$ and $35^b$. The general arrangement and disposition of the parts is the same as hereinbefore specified. However, the main frame includes not only the main longitudinal members 10 but also two other longitudinal members $10^a$ between the wheels 16. The forward ends of these longitudinal members $10^a$ may be secured to the cross beam $11^a$ which forms one of the engine supports; while the rear ends of the members $10^a$ may be mounted upon a plate 40 which extends across the under side of the frame as is best shown in Figs. 3, 4 and 5. This plate 40 is slotted as indicated at 41 for passage of the pusher legs $35^a$ and $35^b$ therethrough, the legs being guided longitudinally by the slots and being also guided by bearing against the longitudinal frame members 10 and $10^a$. In order to make a suitable arrangement (to get the legs 35 far enough rearwardly to be guided by the plate 40—which plate cannot conveniently extend forward of the rear edges of wheels 16) the center 50 of oscillating arms $17^a$ and $17^b$ is in this case a little behind the axle $14^a$ of wheels 16. The axle $14^a$ and center 50 of the oscillating arms may be mounted upon common brackets 51 which are secured to the longitudinal members 10 and $10^a$. The two arms $17^a$ are cross connected by a transverse rod 55, rigidly connected to the arms, so that the arms move together; and the two arms $17^b$ are similarly cross-connected by a transverse rod 56. The pusher legs $35^b$ are pivotally mounted on rod 56 as a pivot; while legs $35^a$ are mounted on pivot pins $55^a$. Rod 55 is further from center 50 than rod 56, so that rod 55 will pass over the ends of arms $17^b$. The pair of connecting rods $21^a$ and $21^b$ are also connected to rod 56 and pins $55^a$, respectively. There are two sets of connecting rods and the crank shaft $23^a$ has four opposite throws $22^a$ and $22^b$. The crank shaft is driven by a chain connection 60 from a shaft 61 which is driven by gears 62 from the engine shaft. It will be seen that the essential difference between this form and the form first described is that the last described form has two pairs of pusher legs and feet, the legs of each pair acting together, and being symmetrically disposed with relation to the longitudinal central axis of the mechanism; so that at all times there is one pair of legs pushing rearwardly and engaging the ground on opposite sides of the central line of travel, so that the draft is always exactly in alignment with the center line of the machine.

Having described a preferred form of my invention, I claim:

1. In tractor mechanisms, a frame, a pivoted diagonal pusher leg movable with relation to the frame; and mechanism, to which the pusher leg is pivoted, mounted on the frame for moving the pusher leg longitudinally; the longitudinal center of gravity of said mechanism and frame being substantially in vertical alignment with the medial position of the upper end of said pusher leg.

2. In tractor mechanisms, a frame, a pivoted diagonal pusher leg movable with relation to the frame; mechanism, to which the pusher leg is pivoted, mounted on the frame for moving the pusher leg longitudinally; the longitudinal center of gravity of said mechanism and frame being substantially in vertical alignment with the medial position of the upper end of said pusher leg; and a carrying wheel for the frame and mechanism mounted upon the frame on a transverse horizontal axis substantially in vertical alignment with the longitudinal center of gravity.

3. In tractor mechanisms, a frame, a pair of pivoted diagonal pusher legs movable with relation to the frame; means, to which the pusher legs are pivoted, mounted on the frame for moving the pusher legs oppositely longitudinally back and forth; the longitudinal center of gravity of said mechanism and frame being substantially in vertical alignment with the medial position of the upper ends of said pusher legs.

4. In tractor mechanisms, a frame, a pair of pivoted diagonal pusher legs movable with relation to the frame; means to which the pusher legs are pivoted mounted on the frame for moving the pusher legs oppositely longitudinally back and forth; the longitudinal center of gravity of said mechanism and frame being substantially in vertical alignment with the medial position of the upper end of said pusher legs; and a carrying wheel for the frame and mechanism mounted upon the frame on a transverse horizontal axis substantially in vertical alignment with the longitudinal center of gravity.

5. In tractor mechanisms, a frame, an oscillating arm pivotally mounted on the frame, mechanism mounted on the frame for oscillating said arm, and a diagonal pusher leg pivoted at one end to the oscillating end of said arm and having its other end in dragging contact with the ground; the longitudinal center of gravity of the frame and mechanism being substantially in vertical alignment with the medial position of the oscillating end of said arm.

6. In tractor mechanisms, the combination of a frame, a transverse axle thereon, a supporting wheel on said axle adapted to support the frame above the ground, an oscillating arm mounted on said axle, a diagonal pusher leg having one end pivotally connected to said arm and the other dragging on the ground, mechanism on the frame for oscillating said arm; and the longitudinal center of gravity of the frame and mechanism being substantially in vertical alignment with the axle.

7. In tractor mechanism, a frame, a transverse axle thereon, a pair of spaced supporting wheels mounted upon said axle to support the frame, a pair of oscillating arms mounted on said axle between said wheels, mechanism mounted on the frame and adapted to oppositely oscillate said arms, and diagonal pusher legs pivotally connected at their upper ends with the oscillating ends of said arms.

8. In tractor mechanisms, a frame, a transverse axle thereon, a pair of spaced supporting wheels mounted upon said axle to support the frame, a pair of oscillating arms mounted on said axle between said wheels, mechanism mounted on the frame and adapted to oppositely oscillate said arms, diagonal pusher legs pivotally connected at their ends with the oscillating ends of said arms; the medial position of said arms being substantially in a position in vertical alignment with said axle; and the longitudinal center of gravity of the frame and mechanism being substantially in vertical alignment with the axle.

9. In tractor mechanisms, a frame, a rolling support for the frame, a pivoted diagonal pusher leg adapted to engage the ground at its lower end; mechanism, to which the pusher leg is pivoted, mounted on the frame for moving the pusher leg longitudinally with relation to the frame; and the longitudinal center of gravity of the whole mechanism being substantially in vertical alignment with the medial position of the upper end of the pusher leg.

10. In tractor mechanism, a frame, a pair of spaced supporting wheels, a pair of oscillating arms pivoted at their end to the frame between the wheels, another pair of oscillating arms pivoted to the frame outside the wheels, a pair of diagonal pusher legs pivoted to the arms between the wheels and a pair pivoted to the arms outside the wheels and mechanism to oscillate the inner arms in unison and the outer arms in unison and oppositely to the inner arms.

In witness that I claim the foregoing I have hereunto subscribed my name this 4th day of September, 1918.

JAMES T. BARKELEW.